2 Sheets—Sheet 1.

D. G. LITTLEFIELD.

Stove.

No. 1,425. Reissued March 3, 1863.

WITNESSES

J. S. Brown

G. A. Follett

INVENTOR

Dennis G. Littlefield.

N. PETERS, Photo-Lithographer, Washington, D. C.

2 Sheets—Sheet 2.

D. G. LITTLEFIELD.

Stove.

No. 1,425. Reissued March 3, 1863.

WITNESSES

J. S. Brown

H. A. Follett

INVENTOR

Dennis G. Littlefield.

N. PETERS. Photo-Lithographer, Washington, D. C.

UNITED STATES PATENT OFFICE.

DENNIS G. LITTLEFIELD, OF ALBANY, NEW YORK.

IMPROVEMENT IN STOVES.

Specification forming parts of Letters Patent No. 14,362, dated March 4, 1856; Reissue No. 1,425, dated March 3, 1863.

DIVISION A.

*To all whom it may concern:*

Be it known that I, DENNIS G. LITTLEFIELD, of the city of Albany, county of Albany, and State of New York, did, on the 4th day of March, 1856, obtain of and from the United States of America certain Letters Patent for and upon a new method of constistructing that class of stoves using a supplying-cylinder for the reserve coal; and I do hereby declare that the following is a full and exact description thereof, reference being had to the accompanying drawings, and to the letters of reference marked thereon.

Figure 1:
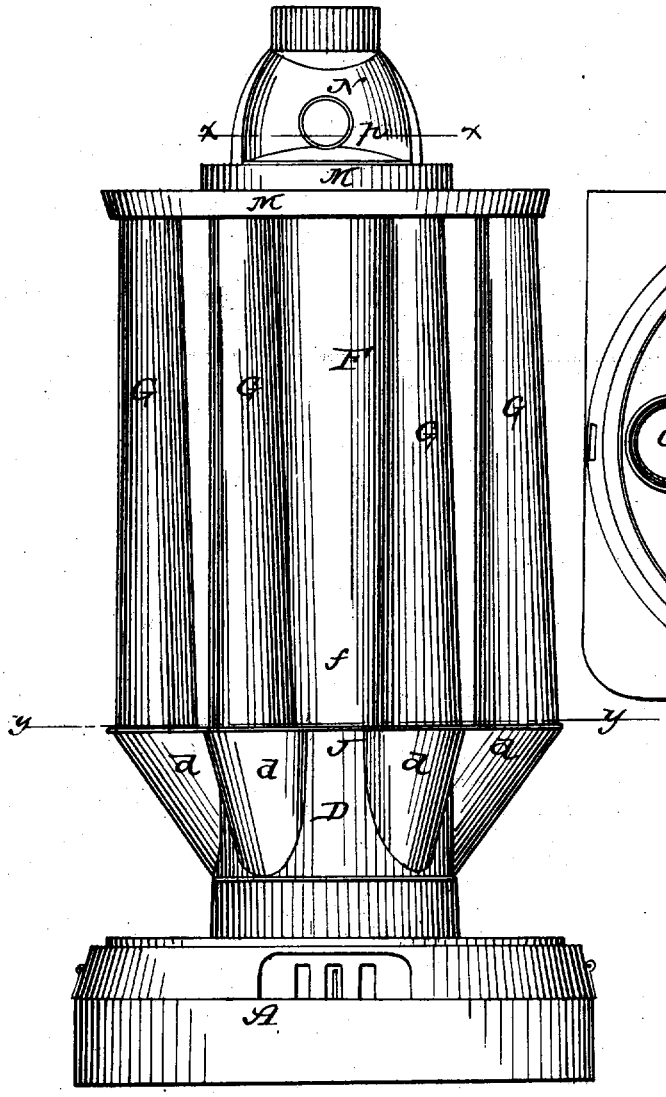
Figure 4:
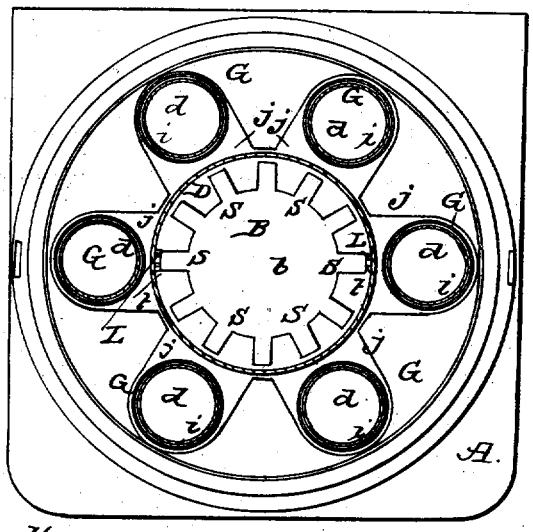
Figure 2:
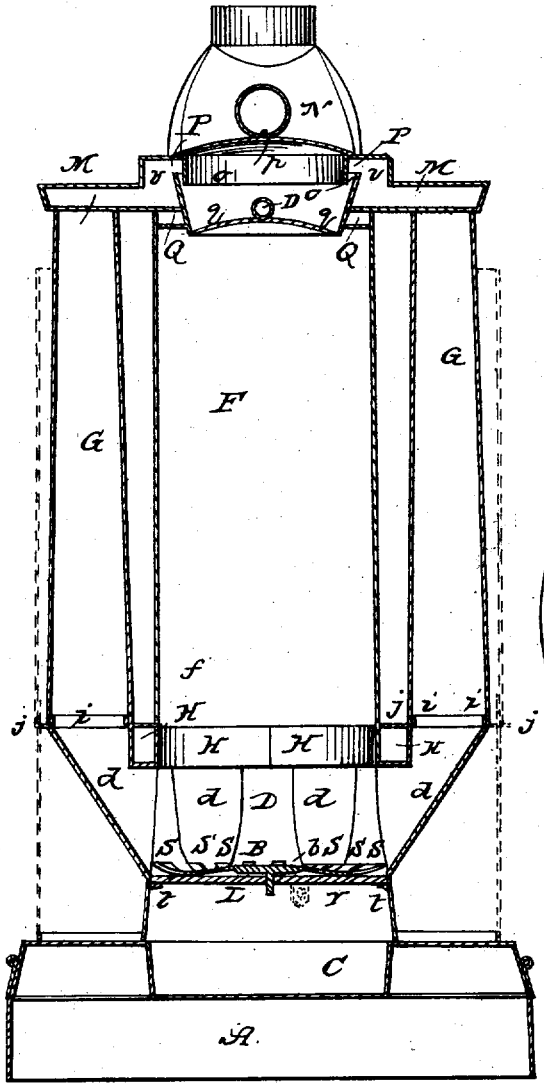
Figure 3:
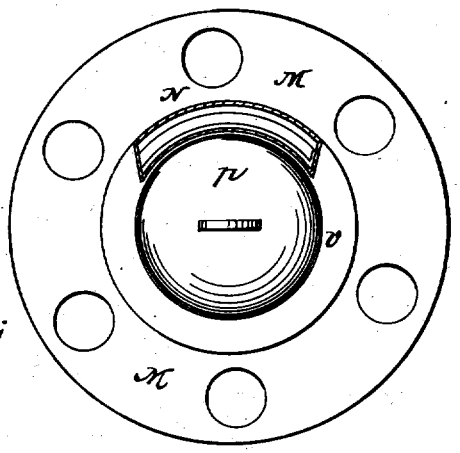

Figure 1 is a front elevation of a stove constructed with my improvements; Fig. 2, a central vertical section thereof; Fig. 3, a plan of the same, showing the smoke-flue in horizontal section in the plane indicated by the line *x x*, Fig. 1; Fig. 4, a horizontal section thereof in the plane indicated by the line *y y*, Fig. 1.

Like letters designate corresponding parts in all the figures.

The nature of my invention consists in the combination of a number of distinct combustion compartments and separate heating-chambers with a single supplying-cylinder so adapted that the said combustion-compartments will receive their fuel from the supplying-cylinder as it descends and becomes ignited; also, in constructing a grate around a solid center or disk, for the purpose of consuming the fuel more rapidly at the exterior and within the combustion-compartments and less rapidly in the center, over the disk, and in combining with said separate heating-chambers and supplying-cylinder an upper chamber so adapted as to receive the products of combustion from the several combustion-compartments, the dust and smoke from the supplying-cylinder when replenishing the same with coal, and also as an intermediate vacuous space through which any air that passes into said chamber is conveyed to the exit-flue, thereby preventing the entrance of air to the supplying-cylinder at the top.

The advantages of these separate combustion-compartments, when combined with and supplied with fuel from one general reservoir, are, first, that the supply of air to support combustion is properly distributed by giving a full supply to the incandescent coal upon the exterior of the fire-grate and within the combustion-compartments and a limited supply to the center of the fire-pot, thereby causing the gases from the supply-coal, as well as the gases from the incandescent coal, to be burned laterally below and outside of the coal-supply cylinder and entirely down to the grate, aiding and resulting in consuming to ashes the coal lying immediately upon the grate and within the combustion-compartments, while that above, as it descends, is being prepared for a more perfect combustion; second, more available heating-surface is provided, since the whole surface of the fire-pot, with its combustion-compartments and heating-chambers, together with the supplying-cylinder and upper chamber, are exposed, so as to radiate their heat and impart it by conduction from all their surfaces; third, a more durable stove, since none of its surfaces are easily destroyed by the action of the fire; fourth, a more powerful heating-stove, as, owing to its construction, the whole exterior surface is brought either to the action of the fire itself or to the direct action of the highly-heated products of combustion.

This improvement is adapted to the use of anthracite or hard coal, which fuel cannot be burned perfectly in the common "updraft" fire-pot unless the same is lined with a non-conducting substance to retain heat for that purpose, whereas with these separate and distinct combustion-compartments, when acting in combination with a supplying-cylinder, a more desirable result is obtained—viz., an entire and perfect combustion and at such points as to readily distribute the heat produced to the surrounding atmosphere, said compartments becoming, as it were, a series of small stoves having their fuel prepared for easy combustion and supplied automatically with the proper quantity, while at the same time they are receiving the gases from the supply coal as well as the gases from the incandescent coal, which, in conjunction, are ignited and burned on passing into these compartments, aiding thereby in the combustion of the refractory portions of the consuming coal from the base of the supplying-cylinder entirely down to the grate, the solid and volatile combustables helping to consume each other, and this in direct contact with a good conducting and heating surface; and, as a further advantage of this construction, the fully-ignited coal within the combustion-compartments reflects upwardly to the heating-chambers the heat of direct radiation, and the whole of the stove's surfaces become uniformly heated, and to a very high degree, without the liability of destroying any of its parts, from the fact that the whole of its surfaces are so exposed as to radiate from and impart its heat to the air which is free to come in contact with it.

I will now proceed to describe the construction shown in the accompanying drawings, which may be varied in its adaptation to the different purposes for which stoves and hot-air furnaces are used and for other purposes, as those skilled in the art will readily perceive.

Upon a suitable base, A, (in which may be the ordinary ash-pan, C, provided with the usual door or aperture, and with a proper draft register or slide,) is situated the fire-pot D, which is provided with recesses or hollow projections *d d*, arranged around its whole periphery, concentric, for symmetry and even action, and generally of a semi-conical form, the apices starting near the bottom of the fire-pot, substantially as represented. These projections or recesses constitute the distinct compartments in which the divided combustion is carried on, as set forth in the nature of my invention. To complete the construction and render these separate combustion-recesses perfect individual stoves in action, their open tops are severally provided with chambers G G, into which the products of combustion ascend and impart their heat, and from which they pass to an upper chamber, M. Across the inlets to the combustion-recesses *d d* there are bars H H of soapstone or fire-brick to protect the metal above from the action of the fire.

Concentrically on the fire-pot D is situated the supplying-cylinder F, which is to extend up to and be connected with the lower side of the upper chamber, M. It should be of the same size as the top of the fire-pot, inside of the soapstone bars H H at that point, and slightly tapering upward to the chamber above, so that the coal will have a tendency to loosen from the sides thereof in descending. The lower part, L, should be of cast-iron and have projections or horizontal plates *j j* to cover the combustion-recesses *d d*, except apertures therein communicating from the recesses to the heating-chambers above. The upper part of the supplying-cylinder may be made of sheet-iron or of cast-iron, if thought desirable, having the joints securely packed, so as to remain air-tight. The projecting plates *j j* have flanges or thimbles *i i* for attaching the heating-chambers G G, the upper ends of which are also connected with the lower side of an upper chamber, M. These combustion-recesses, with their heating-chambers, acting as individual stoves, are thus supplied from the common reservoir F, the coal descending uniformly therefrom, and, gently falling aside from the main body thereto, loosely settles into said recesses in the best condition to burn freely. The air ascending through the grate B below passes laterally to these combustion-recesses from a common space, and thus supplies a full amount for producing a perfect combustion within them all. At the same time, although nearly all the combustion takes place within these recesses, they being contiguous to the heated mass of coal in the center of the fire-pot, the proper temperature is kept up in every part.

In order the more effectually to direct the draft and confine the combustion to the recesses *d d*, I employ a grate, B, of peculiar construction. It consists of a solid central disk, *b*, and radial grate projections *s s* around its periphery, extending outward nearly to the interior surface of the fire-pot D. By this construction the air is kept away from the central mass of coal in the fire-pot and directed through the peripheral grate immediately into the combustion-recesses. The disk portion *b* is preferably, though not necessarily, convex or conical on top to cause the ashes and slag to work outward to the grate, while the radial grate projections are of a dishing form. This grate turns on a central pivot, which passes down through the supporting-bar L, itself sustained by three projections, two being in line and resting in brackets *t t*, while the third one is suspended by a hook, so that by releasing the latter the grate may be tilted down on the brackets *t t* as pivot-bearings, for the purpose of cleaning out the fire-pot when necessary. The grate is vibrated on its central pivot to shake down the ashes and slag by inserting a lever into a lug, *r*, projecting downward from the underside thereof. All the separate heating-chambers G G communicate at the top with a common annular flue or chamber, M, which receives all the products of combustion and conducts them to the exit-flue N, whence the smoke-pipe leads.

To insure the successful operation of this improvement, the supplying-cylinder must be made air-tight and with joints that are "self-packing," so that it will remain so. The fire-pot may be cast in one piece without joints. The heating-chambers G G and the annular flue M cannot be made perfectly air-tight without adding much to the cost of manufacture. For this reason, and also to attain a more perfect operation in the combustion-recesses, it is best to so construct those parts, making them as tight as possible, that the draft of the chimney will tend to make them vacuous spaces, by which construction the deleterious products of combustion cannot escape to poison the air of the room.

Within the circle of the annular flue M an opening, P, ordinarily closed by a cover, *p*, is made for the introduction of coal into the supplying-cylinder F through a funnel-shaped hopper, R, extending upwardly from the top of the supplying-cylinder around a downwardly-projecting rim, *o*, of the opening P, which serves to receive the coal and conduct it into the supplying-cylinder, which has an aperture, Q, a little less in diameter than the opening P above, in order that its cover *q* may be inserted and taken out through said opening. The top casting of the annular flue M is raised at *v* over the upper edge of the hopper R, so as to afford a space for the smoke and gases to escape into the annular flue and pass off to the smoke-pipe as they rise from the supplying-cylinder when in the act of replenishing with coal. The exit-pipe tending to empty the annular flue M when the stove is in operation, any air that passes therein around the outer cover will at once pass to the chimney, instead of to the supplying-cylinder F. Stoves constructed upon this plan may have, if desired, a casing of sheet-iron to conceal the heating-chambers G G from view, the same being perforated or open at top and bottom to allow a free circulation of the air in and out. Air-heating or hot-air furnaces, from their nature, are inclosed in a case or chamber. Stoves of this construction are well adapted for use where an intense heat is sometimes required. For this reason they are particularly valuable for warming railway-cars and other apartments where an intense heat is desirable from a small stove. The same construction is also well adapted for air-heating or hot-air furnaces and kindred purposes.

Having thus described the nature of my invention and the best mode of carrying it into practice, I will now proceed to describe the operation of a stove combining these improvements. The fire is kindled within the fire-pot D, having the cover *q* open. The kindlings may be permitted to burn in this manner for a short time or until the smoke shall have passed off and they are thoroughly ignited, when the supplying-cylinder may be filled with coal and the cover *q* closed. As combustion takes place, all the coal within the fire-pot up to a point just above the recesses *d d* becomes ignited, though the combustion is slow, except in that portion near to and within the said combustion compartments or recesses. The gases from the supply-coal and the gases from the incandescent coal at the center of the fire-pot and between the combustion-recesses are compelled to pass therefrom to said recesses, at which points they commingle with the air coming up at the exterior of the grate B, causing them to be perfectly consumed in close proximity to and within the combustion-recesses, thereby aiding in keeping up a vivid combustion in those recesses, which, extending down to, aid in producing a perfect combustion of the incandescent coal upon the fire-grate B. The products of combustion and of the gases thus utilized pass up into the heating-chambers G G, and thence to the annular flue M, and finally to the exit-flue.

What I claim as my invention, and desire to secure by Letters Patent, is—

1. The combination or two or more distinct combustion-compartments and separate heating-chambers with a single supplying cylinder or reservoir, substantially as and for the purposes herein specified.

2. A grate, B, solid in the central portion and open only in the periphery, substantially as and for the purpose herein set forth.

3. A single receiving chamber or flue, M, in combination with separate heating-chambers and a supplying-cylinder arranged so as to receive and conduct away to the smoke-pipe the products of combustion from said heating-chambers and the gases escaping from the supplying-cylinder, as well as any air that may enter through the replenishing-aperture P, substantially as herein specified.

DENNIS G. LITTLEFIELD.

Witnesses:
J. S. BROWN,
F. A. FOLLETT.